(12) United States Patent
Lian

(10) Patent No.: US 8,239,231 B2
(45) Date of Patent: Aug. 7, 2012

(54) METHOD FOR OPTIMIZING RESOURCE ALLOCATION

(76) Inventor: Jie Lian, Beaverton, OR (US)

(*) Notice: Subject to any disclaimer, the term of this patent is extended or adjusted under 35 U.S.C. 154(b) by 390 days.

(21) Appl. No.: 12/509,745

(22) Filed: Jul. 27, 2009

(65) Prior Publication Data

US 2011/0022438 A1    Jan. 27, 2011

(51) Int. Cl.
  *G06Q 10/00*   (2006.01)
(52) U.S. Cl. ...................................... 705/7.12
(58) Field of Classification Search ............ 705/7.11, 705/7.12

See application file for complete search history.

(56) References Cited

U.S. PATENT DOCUMENTS

| | | | | |
|---|---|---|---|---|
| 5,615,121 A * | 3/1997 | Babayev et al. | ............ | 705/7.22 |
| 6,041,306 A * | 3/2000 | Du et al. | ............ | 705/7.26 |
| 6,044,355 A * | 3/2000 | Crockett et al. | ............ | 705/7.39 |
| 6,223,165 B1 * | 4/2001 | Lauffer | ............ | 705/7.13 |
| 6,859,523 B1 * | 2/2005 | Jilk et al. | ............ | 379/32.01 |
| 2005/0149375 A1 * | 7/2005 | Wefers | ............ | 705/9 |
| 2006/0106774 A1 * | 5/2006 | Cohen et al. | ............ | 707/3 |
| 2009/0299803 A1 * | 12/2009 | Lakritz et al. | ............ | 705/8 |

OTHER PUBLICATIONS

Singh et al "Application-level ResourceProvisioningon the Grid", Dec. 2007, Proceeding of the Second IEEE International, pp. 1-8.*

* cited by examiner

*Primary Examiner* — Romain Jeanty

(57) ABSTRACT

Conventional resource allocation process has intrinsic inefficiency because of the resource fragmentation. A solution is provided to defragment the resource so that the customers' requests are better served and provider's resource utilization rate is improved.

8 Claims, 14 Drawing Sheets

|   | A | B | C | D | E | F |
|---|---|---|---|---|---|---|
| 1 | Booked | Booked | Booked | Booked | Booked | Open |
| 2 | Booked | Open | Open | Open | Open | Open |
| 3 | Booked | Booked | Booked | Booked | Booked | Booked |
| 4 | Booked | Booked | Open | Open | Open | Open |
| 5 | Open | Open | Open | Booked | Booked | Booked |
| 6 | Booked | Booked | Booked | Booked | Booked | Booked |

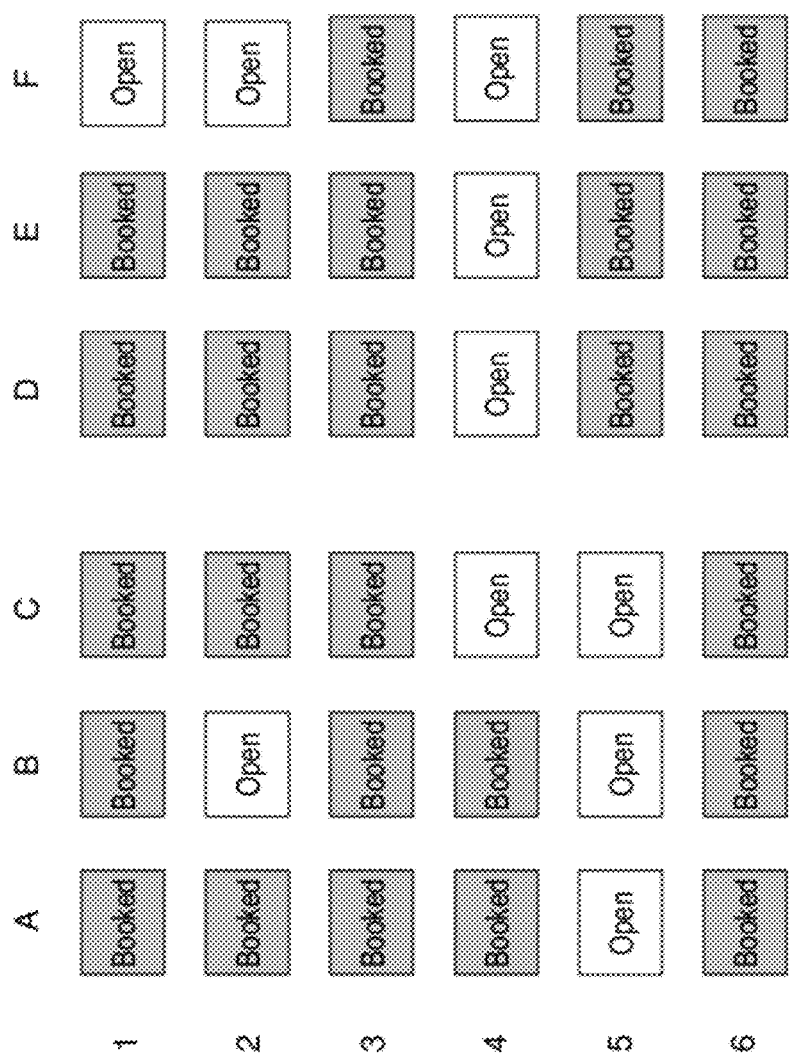

Figure 4(e)

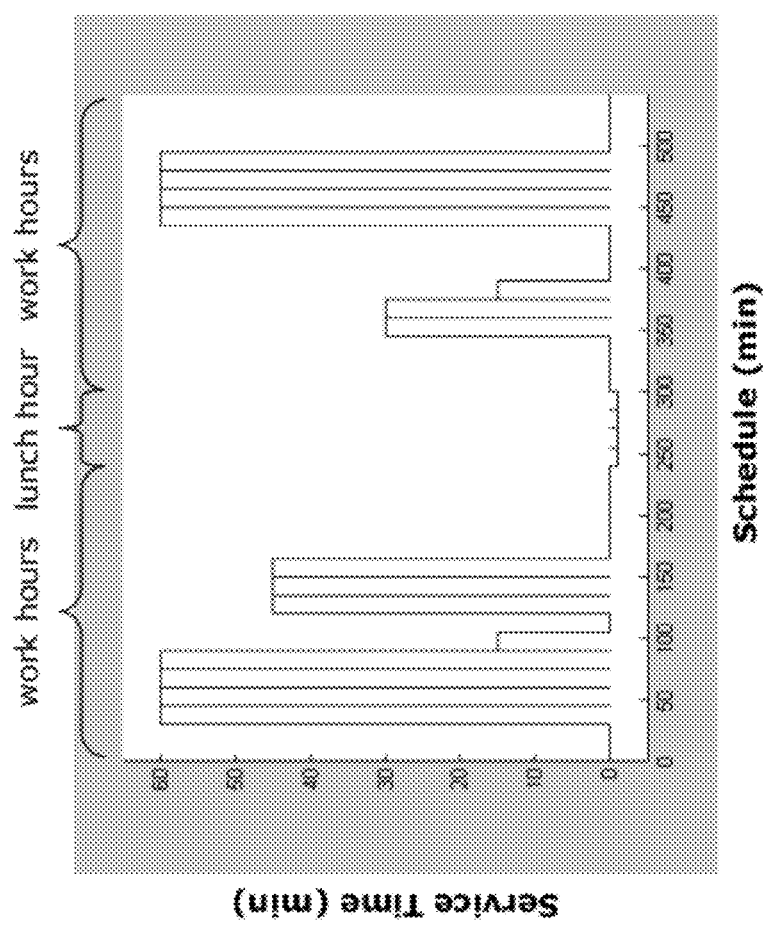

METHOD FOR OPTIMIZING RESOURCE ALLOCATION

FIELD OF THE INVENTION

The present invention relates to a method for improving the utilization rate of service providers' resources which need to be allocated to customers through an appointment or booking process.

BACKGROUND OF THE INVENTION

In many service businesses, providers need to allocate their resources, which typically consist of a finite number of resource slots, to their customers through either an appointment process or a booking process. For example, a physician's working schedule is a resource that consists of finite time slots. Patients normally need to make appointments by selecting available time slots to see their physicians. Such types of appointment scheduling is common for many service providers, including but are not limited to, primary or specialty clinics, hair solons, auto maintenance shops, consultants, technicians, instructors, telephone/cable/internet service providers. As another example, the passenger seats in an air flight are finite resources. Travelers typically need to book the seats (available slots) in advance through travel agencies or online. Similar slot booking is also common to many other service providers, such as movie theaters, sport arenas, test centers, hotels, exhibition halls, etc. In the following descriptions, a resource slot that has been allocated is also called a booked slot, or a busy slot, or a reserved slot, and these terms are used interchangeably. Similarly, an unallocated slot is also called an open slot, or an available slot, or a free slot, and these terms are used interchangeably.

Conventionally, when a customer makes a service request from a provider, the provider's resource database is searched to check if there are available slots that can serve the customer's request. Typically, the provider also asks the customer's preference of the resource slots. Four possible conditions may arise: (1) If the customer's preferred slots are available, then these slots are allocated to the customer; (2) If there are available slots that can serve the customer who has no preference on the slots, then usually the first match or arbitrarily chosen slots are allocated to the customer; (3) If there are available slots that can serve the customer, but none of them fits the customer's preference, then the customer can either accept the non-preferred slots or the customer's request is rejected; (4) If there are no available slots that can serve the customer, then the customer's request is rejected.

For example, when a patient tries to make an appointment with his/her physician, the scheduler first estimates how many time slots are needed for this appointment. Assume the appointment normally takes about 30 minutes, and one unit time slot is 15 minutes, then 2 consecutive time slots will be needed to accommodate this appointment. The scheduler then checks the physician's working schedule to see if there are available time slots (i.e. ≧30 minutes, or at least 2 consecutive unit slots). If there are no available slots, then the patient's appointment cannot be made (condition 4). If the patient has time preference, e.g. morning appointment, but all available slots are in the afternoon, then the patient has to accept the non-preferred time slots or the appointment cannot be made (condition 3). If there are available slots and the patient has no time preference, then usually the first matching or an arbitrarily chosen 30-minute time slots are allocated to the patient (condition 2). Finally, if the patient's preferred time slots are available, then these time slots are allocated to the patient (condition 1).

As another example, when a customer tries to book 3 seats on a flight, the booking system first checks all open seats on the flights. If there are less than 3 open seats, then the customer's request cannot be satisfied (condition 4). If there are at least 3 open seats but none of them meets the customer preference, e.g. 3 adjacent seats, then the customer has to either accept the non-preferred seats or skip the flight (condition 3). If there are at least 3 open seats and the customer has no seat preference, then the first matching or arbitrarily chosen 3 open seats are reserved for the customer (condition 2). Finally, if there are at least 3 open seats that meet the customer's preference, then they are reserved for the customer (condition 1).

The conventional resource allocation practice described above has an intrinsic limitation in efficiency due to the tendency of resource slot fragmentation. The fragmentation of resource slots, which means the open slots and busy slots are juxtaposed, can be caused by the reservation of preferred slots, or the cancellation of previously reserved slots, or both. As a result, the fragmented slots may become difficult to accommodate the customers' requests. Furthermore, the fragmented slots may also cause lower utilization rate of the resources. For example, a patient who needs a 30 minutes appointment may not be accepted despite the availability of 2 separated 15 minutes time slots. These separated time slots, if left unallocated, will be wasted. Similarly, a customer who prefers 3 adjacent seats in a flight may have to accept 3 separated seats, hoping to be able to change the seats at the gate or on the flight (note such requests usually add significant workload to the airline staff). On the other hand, if the customer decides to skip this flight, these 3 seats may be wasted if no other customers book them.

As described above, customer's preference is usually considered when allocating the resource slots. However, there are two issues that have been largely overlooked in the conventional resource allocation process. First, the provider lacks formal guidance on how to allocate the resource slots to minimize the fragmentation. Although it is possible that in some cases, a provider may intentionally encourage customers to pick certain resource slots (e.g., a clinical scheduler may only disclose some available time slots to but withhold other available time slots from a patient), there is no formal and quantitative assessment of each possible resource allocation option and its potential impact on the resource fragmentation status. Second, customer's preference is usually not binary (e.g., like or dislike). Instead, it is a continuous variable that spans the spectrum from highly like to highly dislike, with many intermediate preference levels (e.g. somehow preferred, neutral, less preferred, etc.). Moreover, a customer's decision on selecting resource slots may be affected by external factors other than his/her preference level. For example, due to the established physician-patient relationship, a patient who has slight preference of morning appointment may instead gladly accept (and may even prefer) an afternoon appointment, after being informed that choice may help clinic improve efficiency and reduce waiting time.

In view of the forgoing descriptions, the present invention provides a novel method that can optimize the resource allocation process, so that the customers' requests could be better served and the providers' resources could be better utilized.

SUMMARY OF THE INVENTION

Identifying slot fragmentation as one of the root causes of resource allocation inefficiency, the present invention provides an innovative solution to optimize the resource allocation by means of resource slot defragmentation.

According to a preferred embodiment of the present invention, an algorithm is implemented and incorporated into the computer software that controls the resource allocation process. Upon receiving a service request, the said algorithm searches all options of resource slots that can serve the request, and then quantitatively assess the resulting fragmentation index of each said option. Then a recommendation can be made on how to optimize the allocation of open slots for a service request, i.e., to minimize the fragmentation index of the resulting resource slots. Optionally, predefined preference rules are incorporated to rank the options of available slots that may result in identical fragmentation index. Running the said algorithm, each service request by a customer is provided a ranked list of open slots (if available) ranging from the most provider-preferred to the least provider-preferred. Customers are encouraged but not obliged to choose the provider-preferred slots.

According to this invention, both customer and provider's preferences are taken into consideration when allocating the resource slots. The provider-customer mutual preference could be established through negotiation, incentive, or other means, and provides the guidance on allocating resource to minimize the slot fragmentation. By means of resource slot defragmentation, the reserved slots are aggregated together, leaving more open resource slots bundled together, thus allowing easy accommodation of new service requests.

In addition, preferably for appointment-type time slot allocation, a user interface is provided for the scheduler to define the requirements based on which the software can search all allocated time slots to identify potential slots that may be used for overbooking.

The details of the invention can be understood from the following drawings and the corresponding text descriptions.

BRIEF DESCRIPTION OF THE DRAWINGS

FIG. 3 shows (a) an original list of 20 time slots that include 13 busy slots and 7 open slots, and the resulting lists of time slot map after selecting (b) option 1, (c) option 2, (d) option 3, and (e) option 4, for allocating 2 adjacent unit time slots.

DETAILED DESCRIPTION OF THE INVENTION

In the following descriptions, it is assumed that a provider's resource can be divided into a finite number of non-overlapping unit slots. The unit slot is the smallest resource unit that the provider chooses to allocate to customers. For example, a service provider may divide his/her daily schedule into a finite number of unit time slots, and each unit time slot defines the shortest time interval the provider can serve certain types of customer request. In another example, a service provider's resource is limited space, and the unit slot is the smallest space unit that can be allocated to customers (e.g., each passenger seat in a flight is a unit slot for booking).

The following descriptions also assume that a provider's resource slots can be arranged in specific order so that one unit slot may be adjacent to one or more other unit slots. For example, a physician's time slots are arranged in temporal order, and each unit time slot may be adjacent to a preceding unit time slot, or a following unit time slot, or both. In another example, all passenger seats in a flight can be arranged in spatial order, and each seat may be adjacent to one or more seats on its left, right, front, or back.

Furthermore, the following descriptions assume that each customer request needs either one unit slot or multiple adjacent unit slots. For example, a patient appointment usually needs either one unit time slot or multiple adjacent unit time slots. In another example, a customer usually needs to book one seat or multiple adjacent seats on a flight. If separated unit slots are requested (e.g., time separated appointments, or space separated flight seats, etc.), they can be considered to be generated by separate customer requests.

In many service businesses, resource allocation process is usually supported by dedicated computer software, which can evaluate a customer's service request, check the provider's resource database, and generate a list of available resource slots, if any, that can serve the customer's request. However, most resource allocation software does not take provider-customer mutual preference into account, thus can not provide guidance on how to allocate the provider's resource to minimize the slot fragmentation.

According to a preferred embodiment of the present invention, an algorithm is implemented as a modular software application and incorporated into the computer software that controls the resource allocation process. The algorithm is designed to optimize the resource allocation process so as to increase the utilization rate of providers' resources, and decrease rejection rate of customers' service requests.

Figure 1:
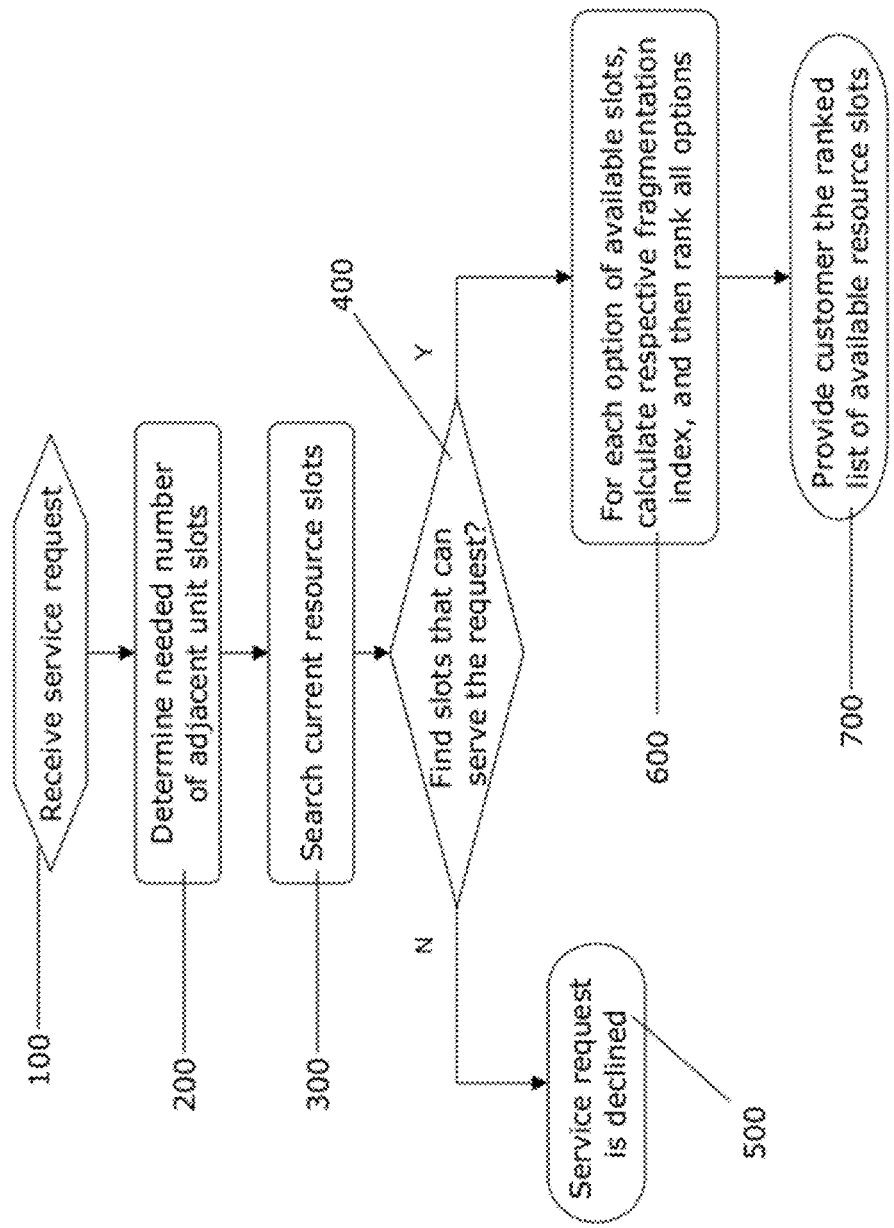
FIG. 1 shows a high-level flowchart diagram illustrating the improved resource allocation process.

FIG. 1 shows a high-level flowchart diagram illustrating the improved resource allocation process. Upon receiving a service request from the customer (step 100), the resource allocation software first evaluates the request to determine how many adjacent unit slots are needed for allocation (step 200). Then the software searches the provider's resource database (step 300) to find all options of available slots that can serve the customer's request. Each option of available slots contains at least the needed number of adjacent unit slots corresponding to the customer request. As well known in the art, the software may search only part of the resource database (i.e., narrow the scope of search) if the customer has strong preference of certain resource slots. For example, only morning schedule is searched if the patient rejects afternoon appointment. In another example, only business class seats are searched if the customer only considers booking those seats in a flight. A condition check (step 400) is performed after searching the resource database. If the software does not find any resource slots that can serve the customer's request, then the service request is declined (step 500). Otherwise, at least one option of resource slots is available that can serve the customer's request. For each option of available resource slots, the software calculates the respective fragmentation index had this option been taken. Then the software ranks all options based on the calculated fragmentation indexes (step 600). Finally, the software generates a ranked list of available resource slots (step 700), where the top option is associated with the smallest fragmentation index (i.e., choosing this option would cause the least fragmentation of the resource slots), and the bottom option is associated with the largest fragmentation index (i.e., choosing this option would cause the most fragmentation of the resource slots).

Therefore, for each service request from a customer, the resource allocation software can generate a ranked list of available slots, if any, ranging from the most provider-preferred to the least provider-preferred. In other words, options ranked high on the list are more favorable to the provider than those ranked low on the list, because the former would result in less resource slot fragmentation. Hence, the ranked list provides the guidance on allocating resources to minimize the slot fragmentation. With this ranked list, both customer and provider's preferences can be taken into consideration when allocating the resource slots. The provider-customer mutual preference could be established through friendly negotiation, monetary or non-monetary incentives, or other means. For example, the options of available resource slots can be presented to the customer in a sequential order so that an option ranked higher on the list is presented first, and an option ranked lower on the list is presented only if the higher ranked options are declined by the customer. In another example, only options that are ranked high on the list are disclosed to the customer whereas other options that are ranked low on the list are withheld from the customer. In summary, customers are encouraged but not obliged to choose the provider-preferred slots (i.e. top options on the ranked list).

Figure 2:
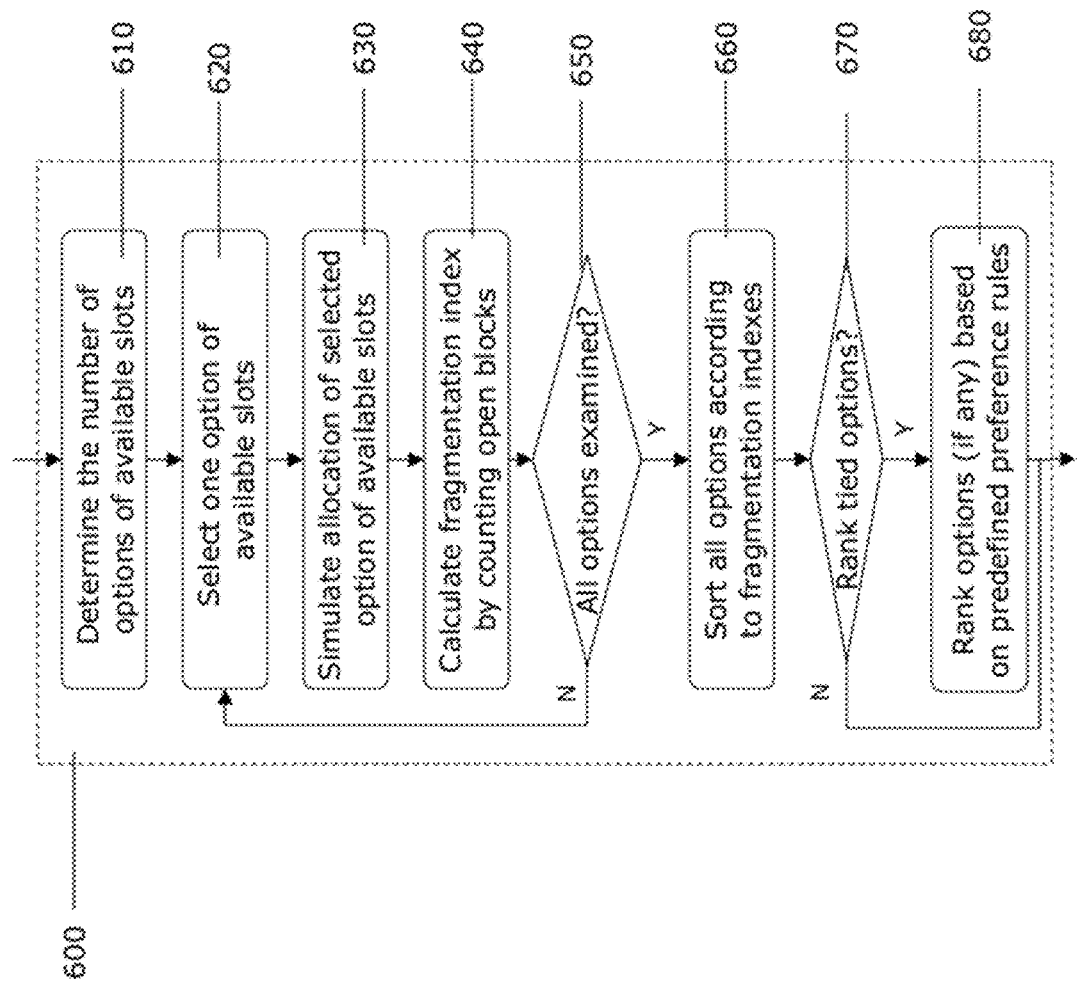
FIG. 2 shows a flowchart diagram illustrating the steps of evaluating and ranking all options of available resource slots.

FIG. 2 shows a flowchart diagram illustrating the method to calculate the fragmentation index and rank all options of available resource slots (step 600). First, the resource allocation software determines the total number of options of available slots that can serve the customer's need (step 610).

For example, FIG. 3(a) illustrates a list of 20 sequential unit time slots (unit slots 1, 2, 3 . . . 20) that are arranged in temporal order. These 20 unit time slots include 13 busy unit slots (already allocated) and 7 open unit slots (not allocated). Assume a new customer request needs 2 adjacent unit time slots, then there are 4 options of available slots that can serve the customer's need: (1) option 1 is to allocate unit slots [3-4] as illustrated in FIG. 3(b); (2) option 2 is to allocate unit slots [4-5] as illustrated in FIG. 3(c); (3) option 3 is to allocate unit slots [9-10] as illustrated in FIG. 3(d); (4) option 4 is to allocate unit slots [19-20] as illustrated in FIG. 3(e).

Figure 4B:
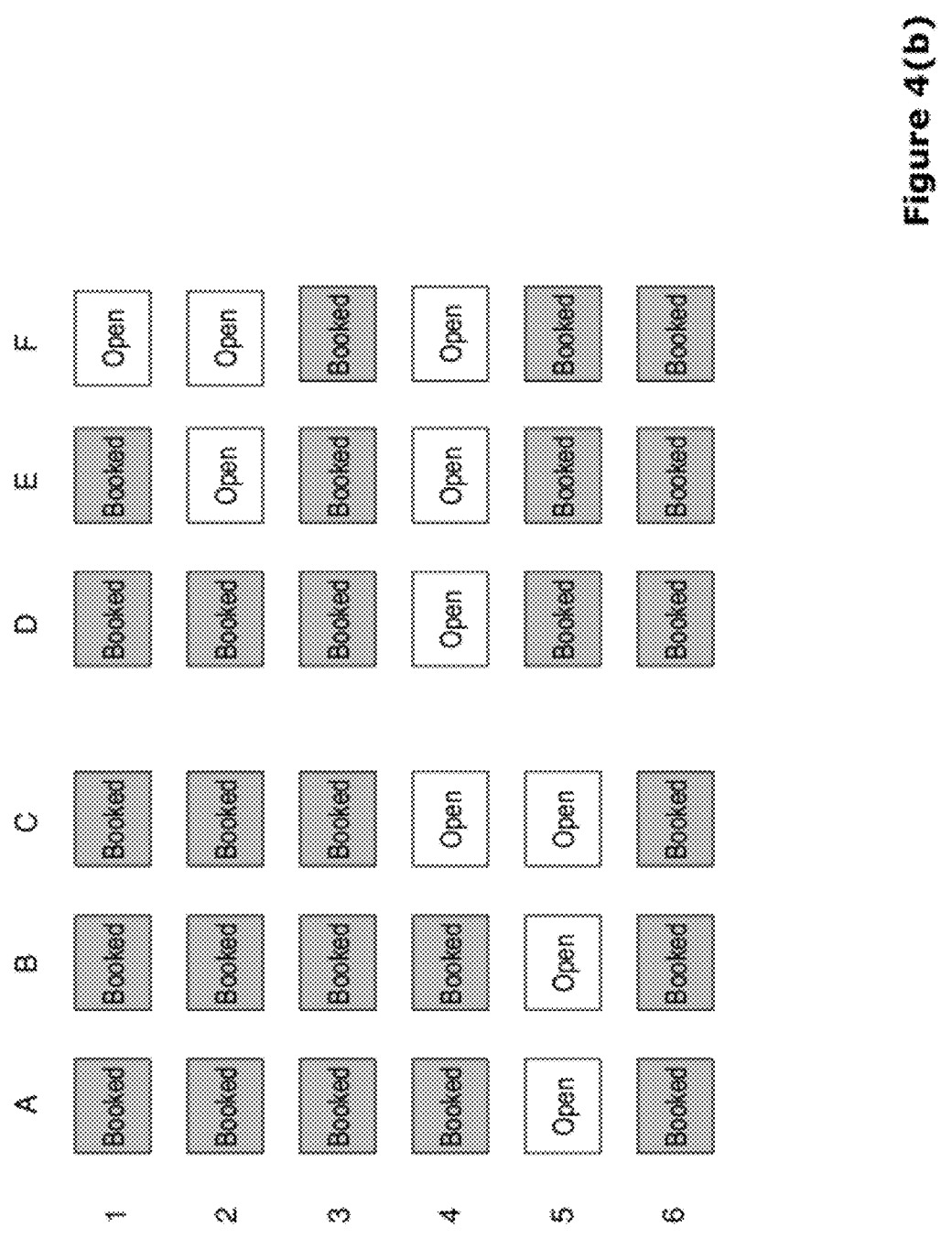
Figure 4D:
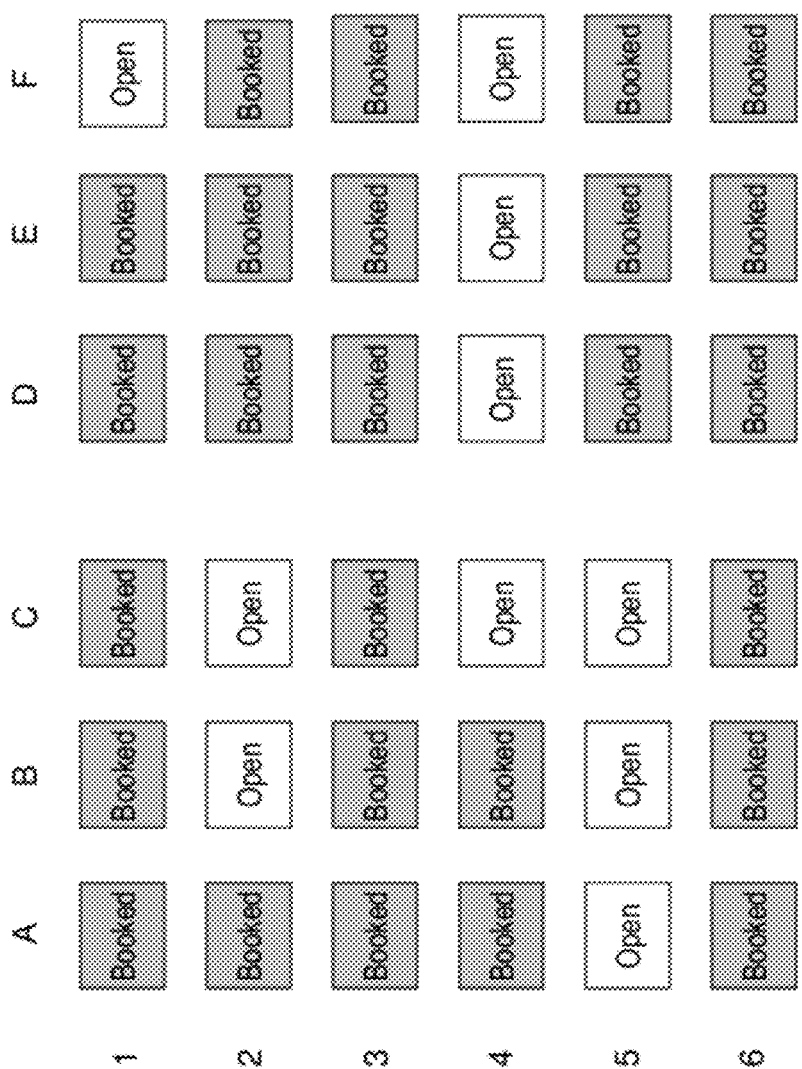
FIG. 4 shows (a) an original array of 36 seats that include 23 booked seats and 13 open seats, and the resulting arrays of seat slot map after selecting (b) option 1, (c) option 2, (d) option 3, (e) option 4, (f) option 5, and (g) option 6, for allocating 3 adjacent seats.
Figure 4E:
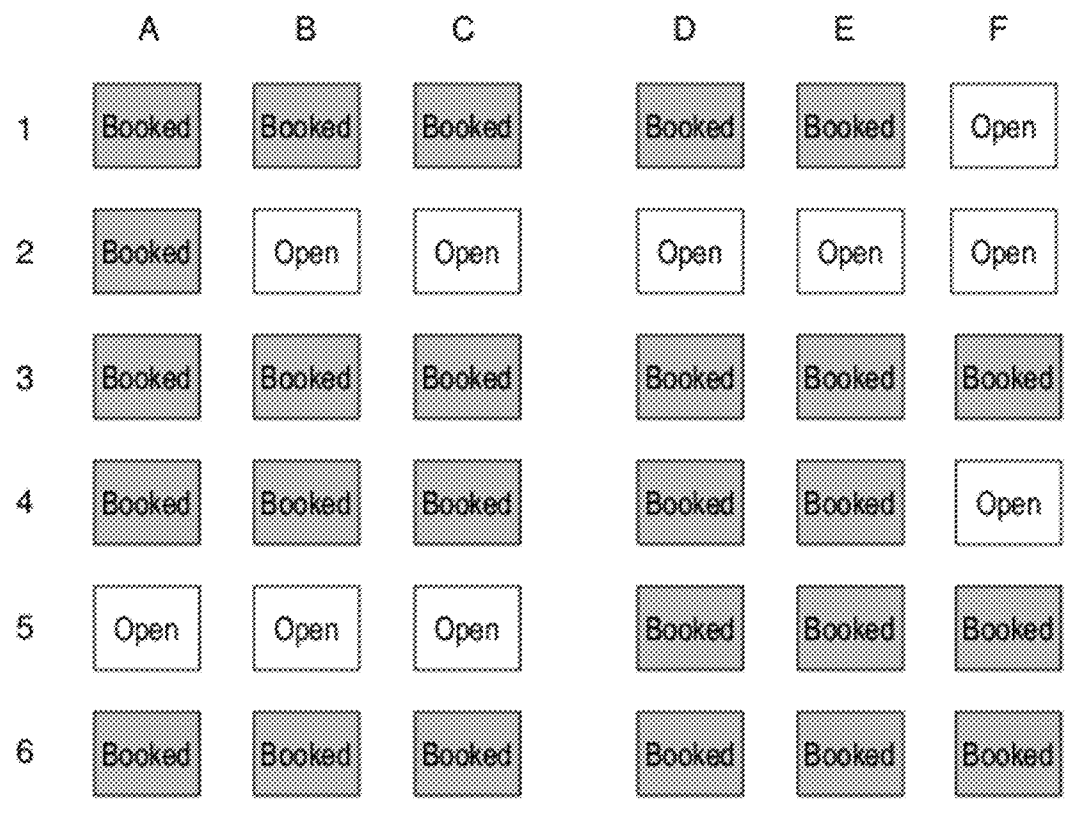
Figure 4F:
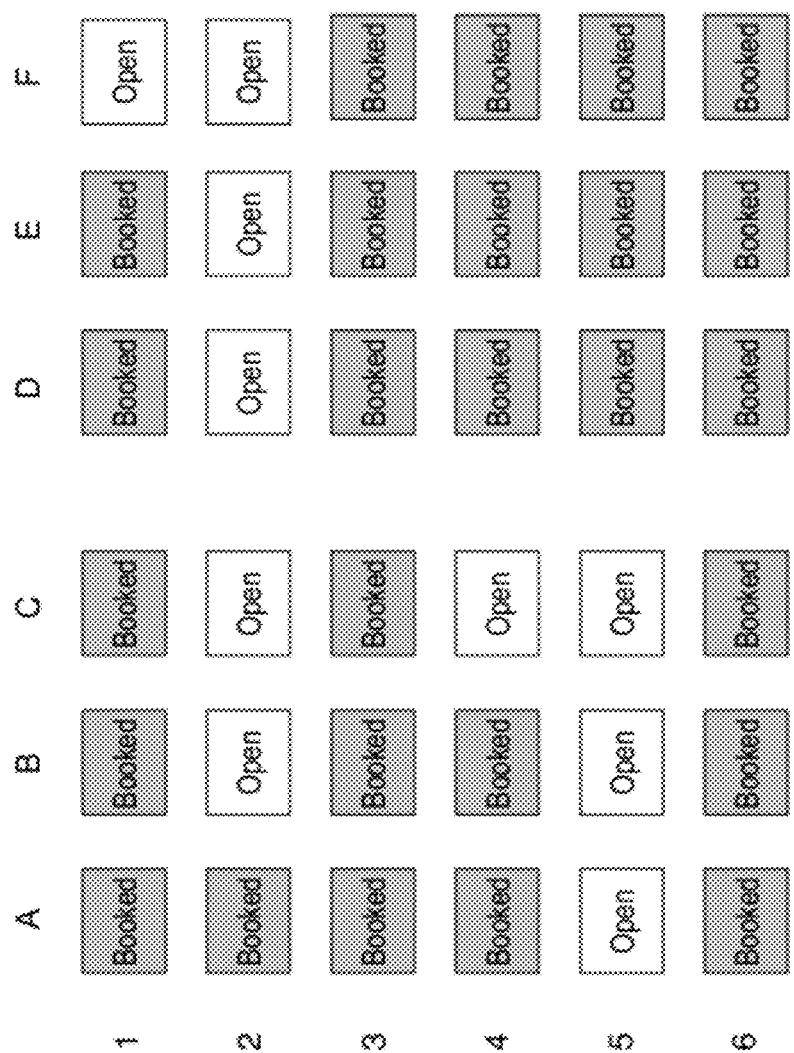
Figure 4G:
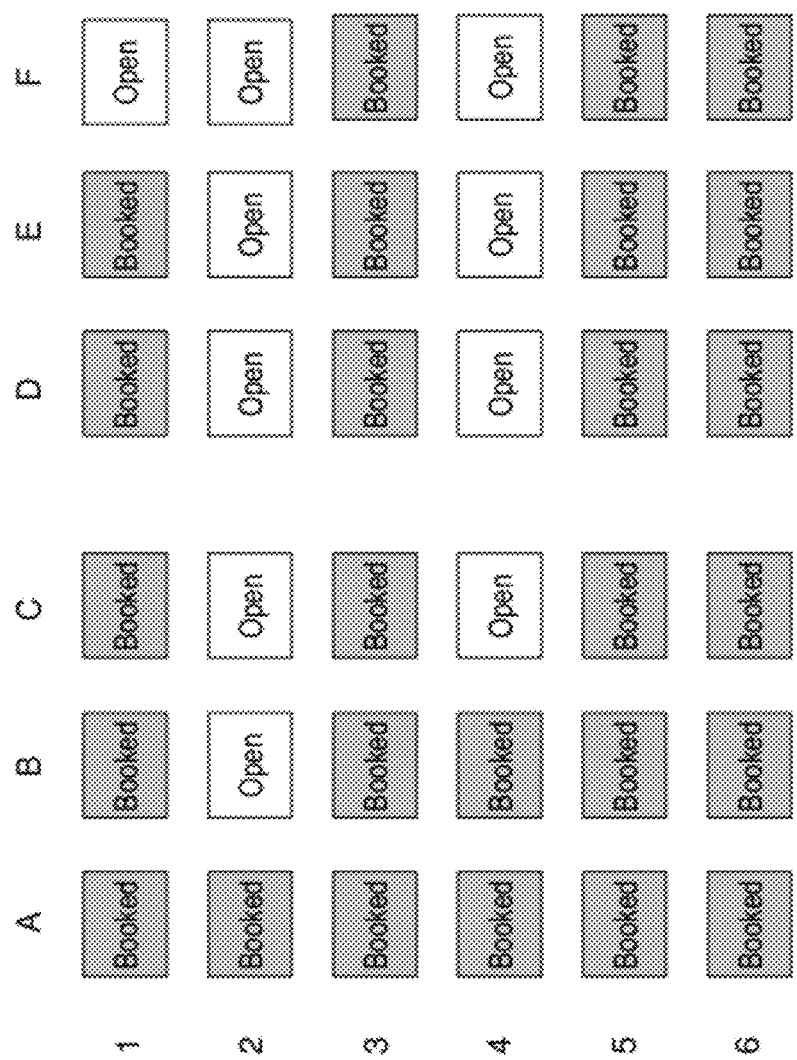

In another example, FIG. 4(a) illustrates a two-dimensional (2D) array of 36 seats that are arranged in 6 rows (rows 1-6) by 6 columns (columns A-F). These 36 seats include 23 booked seats (already allocated) and 13 open seats (not allocated). For different services, there may be different interpretations of adjacency for slots arranged in 2D space. For instance, one may consider two seats are adjacent only if they are next to each other and both are in the same row. Alternatively, one may also consider two seats are adjacent if they are next to each other and both are in the same column. Assume adjacent seats must be in the same row, and a new customer request needs 3 adjacent seats, then there are 6 options of available slots that can serve the customer's need: (1) option 1 is to allocate seats [2B-2D] as illustrated in FIG. 4(b); (2) option 2 is to allocate seats [2C-2E] as illustrated in FIG. 4(c); (3) option 3 is to allocate seats [2D-2F] as illustrated in FIG. 4(d); (4) option 4 is to allocate seats [4C-4E] as illustrated in FIG. 4(e); (5) option 5 is to allocate seats [4D-4F] as illustrated in FIG. 4(f); (6) option 6 is to allocate seats [5A-5C] as illustrated in FIG. 4(g).

Now return to FIG. 2. Among all options of available slots, the software selects one option (step 620), and then simulates allocation of the selected option of available slots by assuming these selected slots are allocated to the customer (step 630). Next, the software calculates the fragmentation index for this option by counting the number of open blocks (step 640). These steps (620, 630, 640) are repeated until all options of available slots are examined (step 650).

According to this invention, the open block is defined as one isolated unit slot or multiple adjacent unit slots that have not been allocated to customers. In the example shown in FIG. 3(a), there are 3 open blocks: unit slots [3-5] form the first open block; unit slots [9-10] form the second open block; unit slots [19-20] form the third open block. FIG. 3(b)-3(e) respectively show the resulting time slot map if any one of the 4 options is selected. Table 1 lists the open blocks and the calculated fragmentation index corresponding to each option.

TABLE 1

Figure 3:
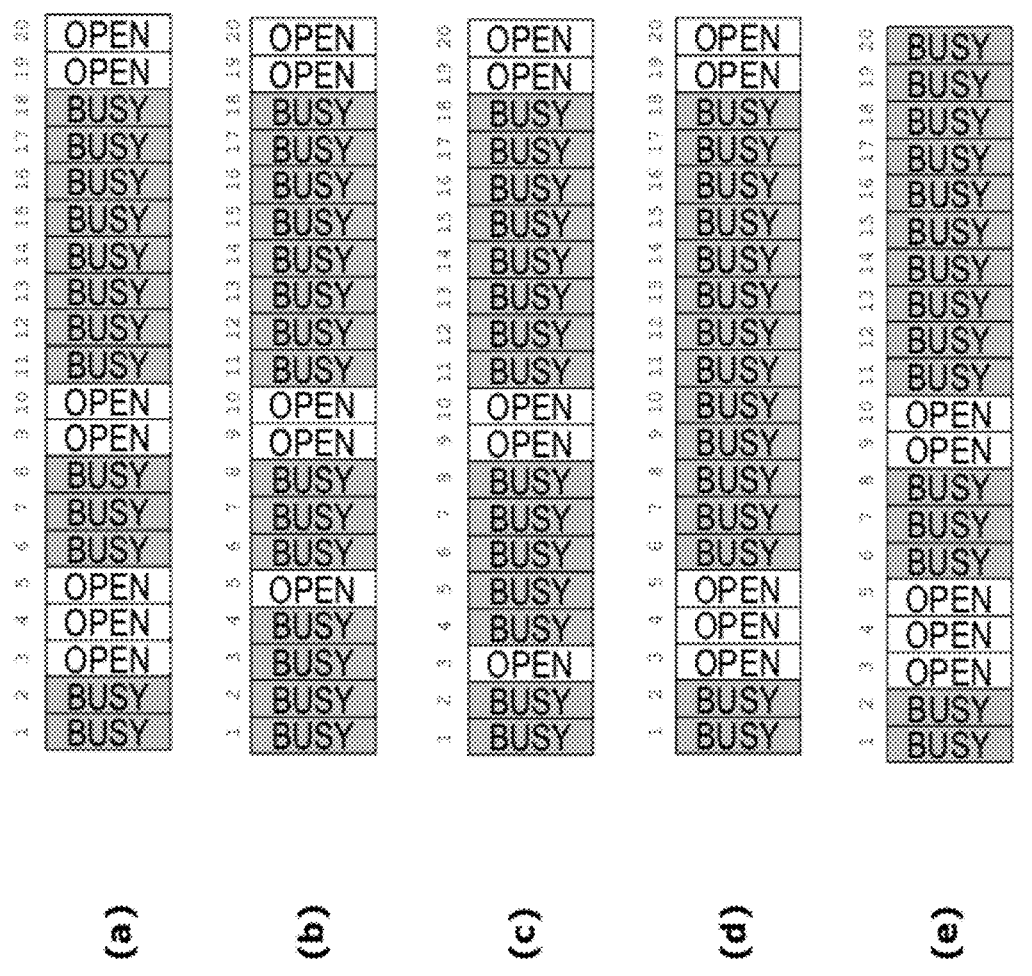

Open blocks and fragmentation indexes for each slot map shown in FIG. 3

| Resource slots | Open blocks | Fragmentation index |
| --- | --- | --- |
| Original list: FIG. 3(a) | [3-5], [9-10], [19-20] | 3 |
| Select option 1: FIG. 3(b) | [5], [9-10], [19-20] | 3 |
| Select option 2: FIG. 3(c) | [3], [9-10], [19-20] | 3 |
| Select option 3: FIG. 3(d) | [3-5], [19-20] | 2 |
| Select option 4: FIG. 3(e) | [3-5], [9-10] | 2 |

Similarly, there are 4 open blocks in the example shown in FIG. 4(a): seat [1F] forms the first open block; seats [2B-2F] form the second open block; seats [4C-4F] form the third open block; seats [5A-5C] form the fourth open block. FIG. 4(b)-4(g) respectively show the resulting seat slot map if any one of the 6 options is selected. Table 2 lists the resulting open blocks and the calculated fragmentation index for each option.

TABLE 2

Open blocks and fragmentation indexes for examples shown in FIG. 4

| Resource slots | Open blocks | Fragmentation index |
| --- | --- | --- |
| Original list: FIG. 4(a) | [1F], [2B-2F], [4C-4F], [5A-5C] | 4 |
| Select option 1: FIG. 4(b) | [1F], [2E-2F], [4C-4F], [5A-5C] | 4 |
| Select option 2: FIG. 4(c) | [1F], [2B], [2F], [4C-4F], [5A-5C] | 5 |
| Select option 3: FIG. 4(d) | [1F], [2B-2C], [4C-4F], [5A-5C] | 4 |
| Select option 4: FIG. 4(e) | [1F], [2B-2F], [4F], [5A-5C] | 4 |
| Select option 5: FIG. 4(f) | [1F], [2B-2F], [4C], [5A-5C] | 4 |
| Select option 6: FIG. 4(g) | [1F], [2B-2F], [4C-4F] | 3 |

Now return to FIG. 2. After all options of available slots are examined (step 650), these options are sorted according to the calculated fragmentation indexes (step 660). For example, from the smallest to the largest fragmentation index, the 4 options illustrated in FIG. 3 can be sorted as two tiers: {option 3, option 4}<{option 1, option 2}, where options enclosed within { } are tied with equal fragmentation index (e.g. the fragmentation index is 2 for both option 3 and option 4, and is 3 for both option 1 and option 2). Similarly, from the smallest to the largest fragmentation index, the 6 options illustrated in FIG. 4 can be sorted as three tiers: {option 6}<{option 1, option 3, option 4, option 5}<{option 2}. Here, the fragmentation index is 3 for option 6, is 4 for options 1, 3, 4, and 5, and is 5 for option 2.

Still refer to FIG. 2. A condition check is provided to control if further ranking of the tied options is needed (step 670). If the options with equal fragmentation index are treated with equal preference or there are no options with equal fragmentation index, then no further ranking is needed, and the sorted option list obtained in step 660 is the final output of the ranked option list. On the other hand, if there are options with equal fragmentation index but different provider preference, then predefined preference rules are applied to further rank these tied options (step 680).

The predefined preference rules may vary for different services. A typical preference rule for appointment-type services is to prefer leaving open slots at the later time so that the later appointment requests could be better served (otherwise, open time slots in the morning may be wasted if the appointment request is made in the afternoon). According to this rule, the 4 options illustrated in FIG. 3 can be ranked from the most preferred to the least preferred as: (1) option 3; (2) option 4; (3) option 1; (4) option 2.

Next consider the examples shown in FIG. 4. To rank the four tied options 1, 3, 4, and 5, one typical preference rule is to minimize the number of extended open blocks. In this example, the extended open block is defined as one isolated open seat or a group of open seats that meet one of the following two conditions: (a) all seats are adjacent to each other in the same row, or (b) some seats are adjacent to each other in the same row (subgroup 1), while the remaining seats are in an adjacent row (subgroup 2), and each seat in subgroup 2 has the same column as one of the seats in subgroup 1. According to this definition, there are 3 extended open blocks for option 1 as shown in FIG. 4(*b*): [1F, 2E, 2F], [4C, 4D, 4E, 4F], [5A, 5B, 5C]. Note although seat 4C can be grouped together with [5A, 5B, 5C] to form an extended open block, it is preferably grouped together with [4D, 4E, 4F] since they are in the same row. Similarly, there are 4 extended open blocks for option 3 as shown in FIG. 4(*d*): [1F], [2B, 2C], [4C, 4D, 4E, 4F], [5A, 5B, 5C]. Also there are 3 extended open blocks for option 4 as shown in FIG. 4(*e*): [1F, 2B, 2C, 2D, 2E, 2F], [4F], [5A, 5B, 5C]. Likewise, there are 2 extended open blocks for option 5 as shown in FIG. 5(*f*): [1F, 2B, 2C, 2D, 2E, 2F], [4C, 5A, 5B, 5C]. Based on the above preference rule, option 5 is more preferable than option 1 and option 4, which are more preferable than option 3. To further rank option 1 and option 4 (both have 3 extended open blocks), another preference rule can be added, for example, to maximize the size of the largest open block. Here, the open block size is defined as the number of unit open slots in the block. According to this preference rule, option 4 is more preferable than option 1. Therefore, combining above two preference rules, the 6 options illustrated in FIG. 4 can be ranked from the most preferred to the least preferred as: (1) option 6; (2) option 5; (3) option 4; (4) option 1; (5) option 3; (6) option 2.

Obviously, besides the above exemplary preference rules, many other preference rules can be applied to rank the options with equal fragmentation index and they are considered within the scope of this invention. On the other hand, it is possible to have tied options with equal fragmentation index in the final ranked list, even after applying the predefined preference rules. In other words, it is normal for a provider to have the same preference for multiple options of available slots.

According to an alternative embodiment of the present invention, the fragmentation index is calculated as the weighted sum of open blocks, instead of the simple count of open blocks. According to specific application and/or a priori knowledge of the probability distribution of different service requests based on past history, there may be different preference for various sizes of open blocks. A less preferred open block size can be assigned a larger weight factor, and a more preferred open block size can be assigned a smaller weight factor. Thus the fragmentation index (FI) can be calculated as:

$$FI = \sum_{k=1}^{n} w_k \cdot c_k,$$

where $c_k$ is the count of open blocks with size k (i.e., containing k open unit slots in the block), n is the largest open block size, and $w_k$ is the positive weight factor associated with open block size k. Obviously, when all $w_k$ are set to 1, the resulting FI is equivalent to the count of open blocks.

In addition, preferably for appointment-type time slot allocation, a user interface is provided for the scheduler to specify requirements based on which the software can search all allocated time slots to identify potential slots that may be used for overbooking. Overbooking means the provider may provide limited amount of service to certain customer requests despite the absence of open time slots. In real practice, overbooking usually occurs when the provider can squeeze enough time from the busy slots to serve a new customer request that needs only limited time. For example, a physician who has 2 consecutive 30-min appointments may squeeze 5 minutes between seeing the 2 patients (e.g., after finishing examine the first patient and before examining the second patient, while the nurse is preparing the examine room) to see a third patient who only needs a quick 5-min routine checkup. To support overbooking, a user-interface is provided for the scheduler to specify a plural of logical conditions. For example, overbooking may be accepted if all the following four conditions are true: (1) there are two adjacent appointments; (2) the first appointment needs more than t1 time; (3) the second appointment needs more than t2 time; (4) the new service request needs less than t3 time (assume t1+t2>>t3). Obviously, for different services, there may be various ways to specify the requirements that support overbooking. Based on the user-specified logical conditions, the software can search the provider's schedule and automatically generate a list of time slots that can be potentially used for overbooking of certain customer requests.

It is believed that the proposed slot defragmentation method can improve the efficiency of resource allocation. This has been demonstrated by a computer simulation study as described in the following.

A computer model was developed to simulate the appointment process for a service provider, whose daily schedule starts from 8 am to noon and from 1 pm to 5 pm, with 1 hour lunch break from noon to 1 pm. Four types of appointment are simulated with needed service time of 15 min, 30 min, 45 min, and 60 min, respectively. Accordingly, the provider's unit time slot is set to 15 min. Thus the provider's daily schedule is initialized to 32 open unit time slots (8 work hours/15 min=32) and 4 unavailable unit time slots (1 hour lunch break/15 min=4). In addition, customers' appointment requests (service time) are simulated by a gamma distribution model which has two parameters that can be modified to adjust the scale and shape of the distribution.

The simulation generates the appointment requests according to the specified gamma distribution model. As described in FIG. 1 and FIG. 2, for each appointment request, the simulation evaluates the needed service time, and then checks the provider's schedule to identify all options of available time slots that can meet the customer's request. If no available time slots can serve the customer's need, then the appointment request is declined. Otherwise, the fragmentation index for each option of available time slots is calculated, and a ranked list of options is generated. A model variable termed "co-op ratio" is introduced to simulate the provider-customer mutual preference. Given two adjacent options O1 and O2 in a ranked list where O1 ranks higher than O2, the co-op ratio is defined as the probability of customer selecting O1 divided by the probability of choosing O2. Hence, if co-op ratio is 1, it simulates customer ignores provider's preference. As co-op ratio increases, it simulates customer has higher probability to follow the provider's preference.

Figure 5B:
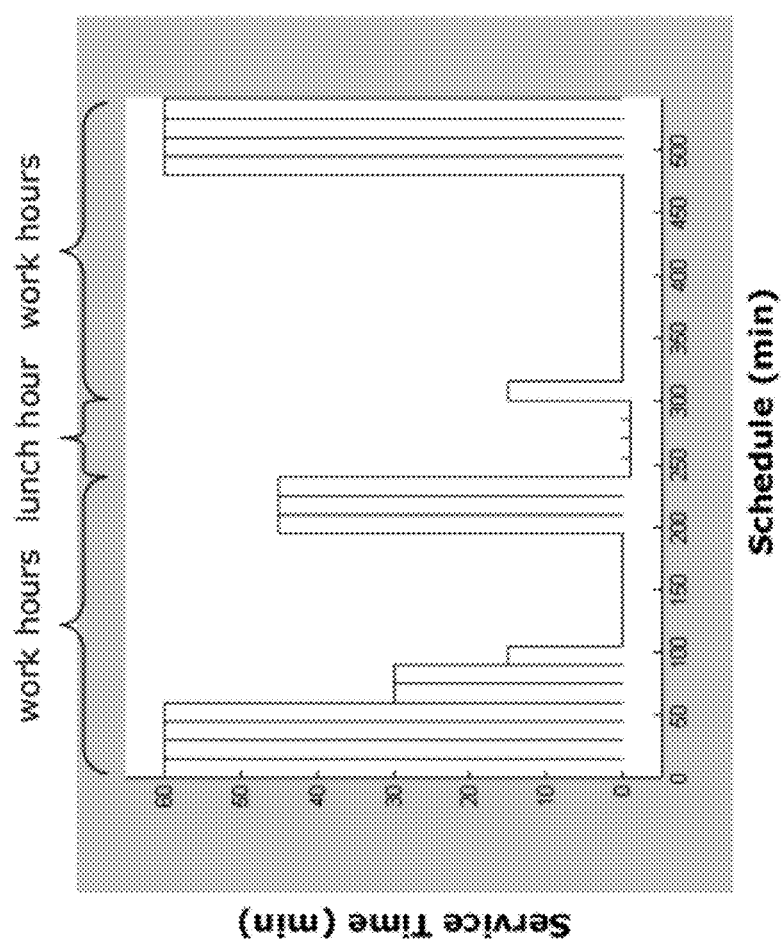
FIG. 5 shows (a) a simulated time slot allocation map after 6 service requests with customer co-op ratio 1.0; (b) a simulated time slot allocation map after 6 service requests with customer co-op ratio 2.0; and (c) a simulated time slot allocation map after 6 service requests with customer co-op ratio 100.
Figure 5C:
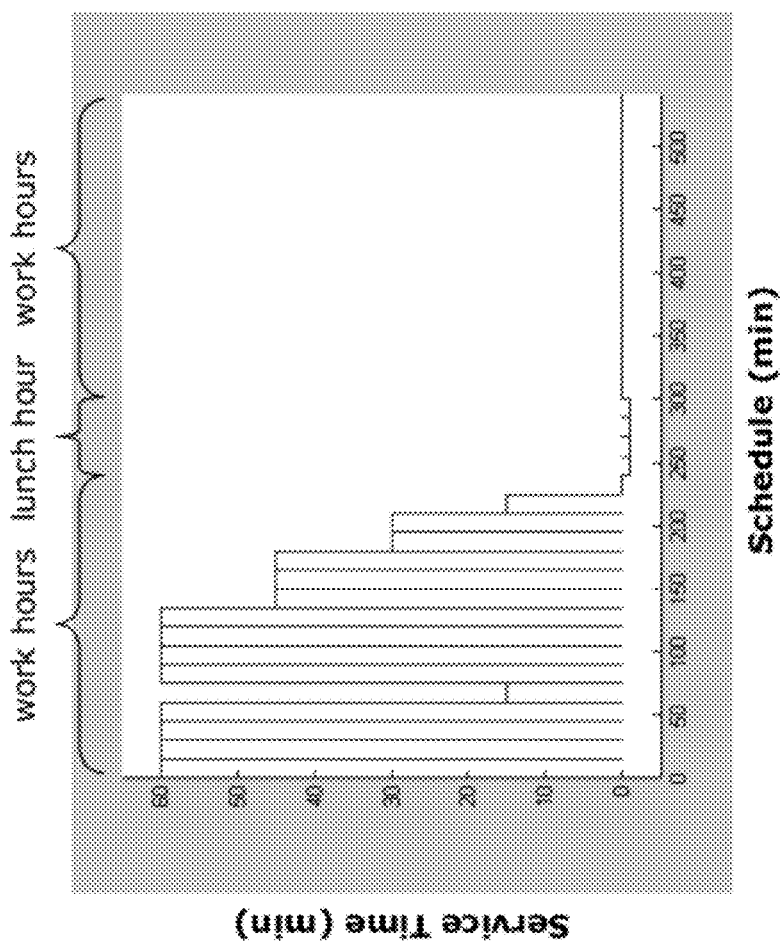

For illustration purpose, FIG. 5(a)-(c) show the simulated provider's time slot maps after accommodating 6 customer requests while the co-op ratio was set to 1.0, 2.0, and 100, respectively. These 6 appointment requests (in temporal sequence) need 60 min, 15 min, 60 min, 45 min, 30 min, and 15 min, respectively. In these plots, the x-axis is the time (unit in minutes) since the beginning of the work schedule (8 am). The y-axis is the allocated service time (unit in minutes). The lunch hour (240-300 min) was marked not for service. Clearly, when customers ignore the provider's preference (co-op ratio 1.0), the provider's schedule becomes very fragmented as shown in FIG. 5(a). Slight consideration of the provider's preference by customers (co-op ratio 2.0) dramatically reduces the schedule fragmentation as shown in FIG. 5(b). When customers fully follow the provider's preference (co-op ratio 100), the schedule becomes least fragmented as shown in FIG. 5(c).

Figure 6:
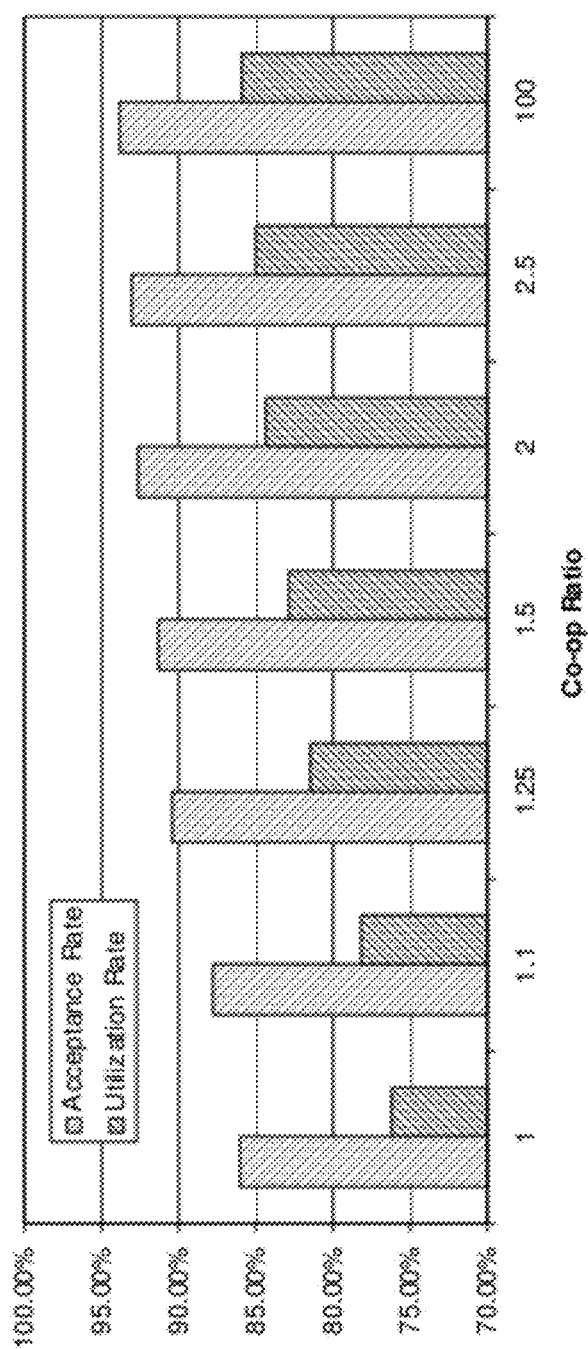
FIG. 6 shows the simulated customer acceptance rate and provider' time slot utilization rate at different co-op ratios.

FIG. 6 illustrates the effect of time slot defragmentation on appointment scheduling efficiency. The simulation varies the co-op ratio from 1.0 to 100. For each co-op ratio, the simulation runs 100 times, and each run simulates 12 different appointment requests from the customers according to a specified gamma distribution model. FIG. 6 shows the average acceptance rate and utilization rate for different co-op ratios. In this simulation, the acceptance rate is defined as the ratio of the number of accepted appointments over the total number of service requests (fixed to 12 in this example). The utilization rate is defined as the ratio of the total allocated appointment time over the total work time (fixed to 8 hours in this example). As can be seen, when customers ignore the provider's preference (co-op ratio 1.0), both the acceptance rate and the utilization rate are limited (about 85% and 75%, respectively), meaning nearly 15% of appointment requests are declined and nearly 25% of provider's time slots are wasted. Both acceptance ratio and utilization ratio are improved when the co-op ratio increases. Of particular interest is that when customers only slightly consider the provider's preference (e.g., co-op ratio from 1.1 to 2.0), the acceptance ratio and utilization ratio are improved dramatically. The improvement becomes less significant when co-op ratio is further increased (e.g., 2.5 or higher). When customers fully follow the provider's preference (co-op ratio 100), the acceptance ratio will saturate at just below 95% and the utilization ratio will saturate at just above 85%. These upper limits indicate the most efficient use of the provider's schedule to accommodate the simulated customer requests. In summary, the above simulation results suggest that with only moderate effort to promote the provider-customer mutual preference (i.e. by encouraging customers to choose options from the ranked list to reduce slot fragmentation), significant improvement in resource allocation efficiency could be achieved.

While the invention has been described with reference to certain embodiments, it shall be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What are claimed are:

1. A method for providing a service provider a ranked list of all available options implemented in a data processing system for guiding the allocation of provider's resource to accommodate the service request from customer(s), wherein the provider's resource comprises: a finite number of non-overlapping unit time slots that are arranged in temporal order so that one unit time slot can be temporally adjacent to one or two other unit time slots, wherein the said unit time slot is the shortest time duration that the provider chooses to allocate to customers;

or a finite number of non-overlapping unit space slots that are arranged in one-dimensional, two-dimensional, or multi-dimensional spatial order so that one unit space slot can be spatially adjacent to one or more other unit space slots, wherein the said unit space slot is the smallest space size that the provider chooses to allocate to customers, comprises the steps of:

estimating the number of adjacent open unit slots that are needed to serve the customer's request;

checking the provider's resource database to identify all options of available slots containing at least the needed number of adjacent open unit slots corresponding to the customer's request;

declining the service request if no resource slots are available to serve the customer's need; or calculating the fragmentation index (FI) for each option of available resource slots;

generating a ranked list of all options of available resource slots based on the said calculated FI values; and guiding customer to select an option of available resource slots based on the said ranked list.

2. The method of claim 1, wherein calculating the FI for an option of available resource slots comprises the steps of:

simulating allocation of the said option of available slots by assuming these selected slots are allocated to the customer;

analyzing the number and size of the resulting open blocks, wherein each open block comprises one isolated open unit slot or multiple adjacent open unit slots, and the size of the open block is the number of open unit slots in the block; and assigning the total number of the resulting open blocks to the FI corresponding to the said option of available resource slots; or setting $$FI = \sum_{k=1}^{n} w_k \cdot c_k,$$

where $c_k$ is the count of open blocks with size k, n is the largest open block size, and $w_k$ is predefined positive weight factor associated with open block size.

3. The method of claim 1, wherein generating a ranked list of all options of available resource slots comprises:

sorting all options of available resource slots from the lowest fragmentation index to the highest fragmentation index;

generating a ranked list of all options of available resource slots where the top option has the lowest fragmentation index and the bottom option has the highest fragmentation index;

optionally further ranking options of available resource slots that have equal fragmentation index based on a plural of preference rules that are predefined by the provider, so that a provider more preferred option ranks higher than a less preferred option.

4. The method of claim 1, wherein guiding customer to select an option of available resource slots comprises:

providing customer all options of available resource slots, and encouraging customer to select the option that is as high as possible on the said ranked list by means of negotiation and/or providing incentives; or presenting to customer the options of available resource slots in a sequential order so that an option ranked higher on the said ranked list is disclosed to customer earlier, and an option ranked lower on the said ranked list is disclosed to customer only if all higher ranked options are declined by the customer; or disclosing to customer only options of available resource slots that are ranked high on the said ranked list while withholding other options of available resource slots that are ranked low on the said ranked list.

5. A computer-based resource allocation system for guiding the allocation of provider's resource to accommodate the service request from customer(s), wherein the provider's resource comprises: a finite number of non-overlapping unit time slots that are arranged in temporal order so that one unit time slot can be temporally adjacent to one or two other unit time slots, wherein the said unit time slot is the shortest time duration that the provider chooses to allocate to customers; or a finite number of non-overlapping unit space slots that are arranged in one-dimensional, two-dimensional, or multi-dimensional spatial order so that one unit space slot can be spatially adjacent to one or more other unit space slots, wherein the said unit space slot is the smallest space size that the provider chooses to allocate to customers, comprises:

means for estimating the number of adjacent open unit slots that are needed to serve the customer's request;

means for checking the provider's resource database to identify all options of available slots containing at least the needed number of adjacent open unit slots corresponding to the customer's request;

means for declining the service request if no resource slots are available to serve the customer's need; or means for calculating the fragmentation index (FI) for each option of available resource slots;

means for generating a ranked list of all options of available resource slots based on the said calculated FI values; and means for guiding customer to select an option of available resource slots based on the said ranked list.

6. The computer-based resource allocation system as claimed in claim 5, wherein means for calculating the FI for an option of available resource slots comprises:

means for simulating allocation of the said option of available slots by assuming these selected slots are allocated to the customer;

means for analyzing the number and size of the resulting open blocks, wherein each open block comprises one isolated open unit slot or multiple adjacent open unit slots, and the size of the open block is the number of open unit slots in the block; and means for assigning the total number of the resulting open blocks to the FI corresponding to the said option of available resource slots; or setting $FI=\Sigma_{k=1}^{n} w_k \cdot c_k$, where $c_k$ is the count of open blocks with size k, n is the largest open block size, and $w_k$ is the predefined positive weight factor associated with open block size k.

7. The computer-based resource allocation system as claimed in claim 5, wherein means for generating a ranked list of all options of available resource slots comprises:

means for sorting all options of available resource slots from the lowest fragmentation index to the highest fragmentation index;

means for generating a ranked list of all options of available resource slots where the top option has the lowest fragmentation index and the bottom option has the highest fragmentation index;

means for optionally further ranking options of available resource slots that have equal fragmentation index based on a plural of preference rules that are predefined by the provider, so that a provider more preferred option ranks higher than a less preferred option.

8. The computer-based resource allocation system as claimed in claim 5, wherein means for guiding customer to select an option of available resource slots comprises:

means for providing customer all options of available resource slots, and encouraging customer to select the option that is as high as possible on the said ranked list by means of negotiation and/or providing incentives; or means for presenting to customer the options of available resource slots in a sequential order so that an option ranked higher on the said ranked list is disclosed to customer earlier, and an option ranked lower on the said ranked list is disclosed to customer only if all higher ranked options are declined by the customer; or means for disclosing to customer only options of available resource slots that are ranked high on the said ranked list while withholding other options of available resource slots that are ranked low on the said ranked list.

\* \* \* \* \*